(12) United States Patent
Cho (10) Patent No.: US 11,124,431 B2
(45) Date of Patent: Sep. 21, 2021

(54) SYSTEM AND METHOD FOR WATER TREATMENT INCLUDING GRANULAR ACTIVATED CARBON REGENERATION

(71) Applicant: ONVECTOR LLC, King of Prussia, PA (US)

(72) Inventor: Daniel J. Cho, Philadelphia, PA (US)

(73) Assignee: Onvector LLC, King of Prussia, PA (US)

( * ) Notice: Subject to any disclaimer, the term of this patent is extended or adjusted under 35 U.S.C. 154(b) by 189 days.

(21) Appl. No.: 16/698,360

(22) Filed: Nov. 27, 2019

(65) Prior Publication Data

US 2020/0171409 A1   Jun. 4, 2020

Related U.S. Application Data

(60) Provisional application No. 62/917,268, filed on Nov. 30, 2018.

(51) Int. Cl.
*C02F 1/28* (2006.01)
*B01J 20/34* (2006.01)
(Continued)

(52) U.S. Cl.
CPC .............. *C02F 1/283* (2013.01); *B01J 20/20* (2013.01); *B01J 20/3416* (2013.01);
(Continued)

(58) Field of Classification Search
None
See application file for complete search history.

(56) References Cited

U.S. PATENT DOCUMENTS

| 4,261,857 A | * | 4/1981 | Nakao | B01J 20/3441 |
| | | | | 373/120 |
| 5,505,825 A | * | 4/1996 | Gold | B01D 53/0454 |
| | | | | 95/126 |

FOREIGN PATENT DOCUMENTS

EP   0460244 A1 * 12/1991 .......... B01J 20/3416

OTHER PUBLICATIONS

Guang-Zhou Qu, Jie Li, Guo-Feng Li, Yan Wu, Na Lu, DBD regeration of GAC loaded with acid orange 7, Asia-Pacific Journal of Chemical Engineering, May 14, 2009, 4, pp. 649-653.
(Continued)

*Primary Examiner* — Matthew O Savage
(74) *Attorney, Agent, or Firm* — Mintz Levin Cohn Ferris Glovsky and Popeo, P.C.

(57) ABSTRACT

A water treatment system includes an adsorption column including granular activated carbon (GAC) that adsorbs contaminants from untreated water onto the GAC, thereby producing treated water, a first electrode disposed at a proximal side of the adsorption column, with a gap between the first electrode and the GAC, a second electrode disposed at a distal side of the adsorption column, a drain outlet in fluid communication with the adsorption column for draining water out of the adsorption column, a gas inlet in fluid communication with the adsorption column for injecting a displacement gas into the adsorption column, a high voltage power supply electrically connected to one of the first electrode and the second electrode for generating a plasma discharge within the GAC, thereby regenerating the GAC within the adsorption column, and a gas outlet in fluid communication with the adsorption column for venting waste gas produced by the plasma discharge.

30 Claims, 7 Drawing Sheets

(51) Int. Cl.
*B01J 20/20* (2006.01)
*B01D 15/20* (2006.01)
*C02F 101/36* (2006.01)
*C02F 101/30* (2006.01)

(52) U.S. Cl.
CPC ......... *B01J 20/3441* (2013.01); *B01D 15/203* (2013.01); *C02F 2101/301* (2013.01); *C02F 2101/36* (2013.01); *C02F 2303/16* (2013.01)

(56) References Cited

OTHER PUBLICATIONS

Forrester, Simultaneous Removal of Both Regulated and Emerging Contaminants using Granular Activated Carbon, CalgonCarbon, Nov. 20, 2018.

Yang, Plasma Discharge in Water and Its Applications for Industrial Cooling Water Treatment, Thesis, Drexel University, Jun. 2011.

* cited by examiner

SYSTEM AND METHOD FOR WATER TREATMENT INCLUDING GRANULAR ACTIVATED CARBON REGENERATION

CROSS REFERENCE TO RELATED APPLICATION

This application claims priority from U.S. Provisional Patent Application No. 62/917,268 filed on Nov. 30, 2018 entitled SYSTEM AND METHOD FOR WATER TREATMENT INCLUDING GRANULAR ACTIVATED CARBON REGENERATION, which is hereby incorporated by reference.

BACKGROUND

Per- and polyfluoroalkyl substances (PFAS) are a group of man-made chemicals that are becoming the focus of increasingly intense regulatory attention. Their thermal stability and lipid and water repelling properties have contributed to the extensive use of PFAS in a wide range of applications, such as in aqueous film forming foams (AFFFs), Teflon production, chromium electroplating, textile manufacturing, and household products. The most attention has been given to the sulfonate and carboxylate PFAS forms, and most recent regulatory actions focus on perfluorooctane sulfonate (PFOS) and perfluorooctanoic acid (PFOA). See Kucharzyk, K. H., et al., *Novel treatment technologies for PFAS compounds: A critical review*. Journal of environmental management, 2017. 204: p. 757-764.

The most commonly used treatment method for PFOA and PFOS removal from groundwater is adsorption onto granular activated carbon (GAC), followed by incineration of the spent GAC. This technology is well-established and commonly used for a variety of environmental contaminants and the currently accepted remediation technology for groundwater impacted by PFOS and PFOA. See Id.

GAC is deployed at a broad range of scales between municipal water treatment and domestic point of entry systems, either as a standalone technology or part of a treatment train. GAC can consistently remove PFOS at parts per billion (ppb) or micrograms per liter (μg/L) concentrations with an efficiency of more than 90 percent. See Ross, I., et al., *A review of emerging technologies for remediation of PFASs*. Remediation Journal, 2018. 28(2): p. 101-126. GAC systems have become the baseline against which all new adsorbent technologies targeting PFAS removal from water are compared. See Id. For example, although ion exchange resins previously used for perchlorates can provide higher treatment flow rates for PFAS than GAC due to their shorter empty bed contact times, they are much more costly and subject to interference and scavenging by other contaminants. Membranes on the other hand, while highly effective, create a 25% reject stream that leaves a secondary treatment gap. GAC remains the de facto, low-cost standard treatment modality, however, GAC can be inefficient for removing PFOA and progressively less effective for removing shorter chain perfluorinated carboxylic acids (PFCAs) such as perfluorohexanoic acid (PFHxA), perfluoropentanoic acid (PFPeA), perflorobutane sulfonate (PFBS), and perfluorobutanoic acid (PFBA) as the chain length diminishes. See Oliaei, F., et al., *PFOS and PFC releases and associated pollution from a PFC production plant in Minnesota (USA)*. Environmental Science and Pollution Research, 2013. 20(4): p. 1977-1992; Inyang, M. and E. R. Dickenson, The use of carbon adsorbents for the removal of perfluoroalkyl acids from potable reuse systems. Chemosphere, 2017. 184: p. 168-175.

Competition for sorption sites on GAC either from longer chain PFASs, natural organic matter, or co-contaminants such as chlorinated solvents can lead to desorption and release of previously adsorbed PFHxA and PFBA. See Kucharzyk, K. H., et al., *Novel treatment technologies for PFAS compounds: A critical review*. Journal of environmental management, 2017. 204: p. 757-764; Ross, I., et al., *A review of emerging technologies for remediation of PFASs*. Remediation Journal, 2018. 28(2): p. 101-126. Use of GAC may not be feasible if natural organic matter is also present in water to be treated. The presence of natural organic matter (e.g., levels of 1.7 mg/L or higher in creek water) has been reported to cause a significant inhibitory effect on the efficiency of removal for all PFAAs, including long-chain species such as perfluorononanoic acid. PFAS adsorption may be diminished by the presence of other organic compounds with similar molecular weights that have higher sorption potential. See Qiu, Y., *Study on treatment technologies for perfluorochemicals in wastewater*, Ph.D. Thesis, Kyoto University, Kyoto, Japan. 2007, Kyoto University, Japan.

A number of chemical contaminants including PFAS can be removed from water through the adsorption process by the exceptionally large surface areas available in GAC, which has a unique pore structure consisting of micro-pores, meso-pores and macro-pores. For example, a single gram of GAC can have a surface area exceeding 1,000 $m^2$. Accessibility to the adsorption sites within the GAC pore structure and the surface area available are the key to maximizing performance. This is a function of (1) the degree of activation of the carbon base, which is measured by its carbon tetrachloride number (CTC), and (2) the relative surface area of carbon measured by the iodine number. The mesh size of a particular GAC form factor may not affect its ultimate adsorptive performance but does affect hydraulic performance (i.e., pressure drop) and kinetics (i.e., the rate of reaction).

Importantly, when the GAC surface is covered by chemical contaminants, its adsorption efficiency dramatically decreases. Recent research indicates that high-temperature (800-1,100° C.) incineration is necessary to completely destroy PFOS and PFOA adsorbed to GAC. See Ross, I., et al., *A review of emerging technologies for remediation of PFASs*. Remediation Journal, 2018. 28(2): p. 101-126; Lee, Y. C., et al., Promoted degradation of perfluorooctanoic acid by persulfate when adding activated carbon. Journal of hazardous materials, 2013. 261: p. 463-469. The required degradation temperature has been demonstrated to increase with longer perfluoroalkyl chain lengths. See Rayne, S. and K. Forest, *Perfluoroalkyl sulfonic and carboxylic acids: a critical review of physicochemical properties, levels and patterns in waters and wastewaters, and treatment methods*. Journal of Environmental Science and Health Part A, 2009. 44(12): p. 1145-1199.

Because of challenging economic and solid waste disposal considerations, it is generally more preferable to regenerate spent carbon for subsequent reuse than to dispose of it. See Perrich, J. R., *Activated carbon adsorption for wastewater treatment*. 2018: CRC press, Boca Raton. In the regeneration process, the objective is to remove the previously adsorbed materials from the carbon porous structure, thus reinstituting its ability to adsorb impurities. There are several methods of regeneration, such as thermal, steam treatment, solvent extraction, acid or base treatment, and chemical oxidation. See Dombrowski, P. M., et al., *Technology review and evaluation of different chemical oxidation conditions on treatability of PFAS. Remediation Journal, 2018. 28(2): p. 135-150. Of these methods, only thermal regeneration is widely applied in wastewater treatment. See Perrich, J. R., *Activated carbon adsorption for wastewater treatment.* 2018: CRC press, Boca Raton. Thermal regeneration is the process, performed in large reactivation kilns, of drying, thermal desorption, and application of high temperature (800-1,000° C.) in the presence of limited quantities of oxidizing gases such as water vapor and oxygen. See Id. Since thermal regeneration is an energy-intensive process, and requires additional capital cost associated with a conveyor transportation system to move wet spent GAC from reactor to furnace, it is used only for very large GAC systems.

Therefore, there is a need for an in-situ energy-efficient regeneration process, ideally, one that is versatile enough to be adapted for small, medium, and large GAC systems.

SUMMARY

Various embodiments described herein relate to systems and methods for removing contaminants such as PFAS from wastewater and leachates and decompose them directly on the spent GAC using high-voltage arc plasma. In so far as high-voltage plasma can be ignited and well controlled between carbon granules, then the spent GAC can be regenerated in situ with dramatic increases in energy efficiency. In accordance with one or more embodiments, a water treatment system includes an adsorption column including granular activated carbon (GAC) that adsorbs contaminants from untreated water onto the GAC, thereby producing treated water, a first electrode disposed at a proximal side of the adsorption column, with a gap between the first electrode and the GAC, a second electrode disposed at a distal side of the adsorption column, a drain outlet in fluid communication with the adsorption column for draining water out of the adsorption column, a gas inlet in fluid communication with the adsorption column for injecting a displacement gas into the adsorption column, a high voltage power supply electrically connected to one of the first electrode and the second electrode for generating a plasma discharge within the GAC, thereby regenerating the GAC within the adsorption column, and a gas outlet in fluid communication with the adsorption column for venting waste gas produced by the plasma discharge. In certain embodiments, the first electrode can be a high voltage electrode, the second electrode can be a ground electrode, and the high voltage power supply can be electrically connected to the first electrode. In certain other embodiments, the first electrode can be a ground electrode, the second electrode can be a high voltage electrode, and the high voltage power supply can be electrically connected to the second electrode. In some embodiments, the plasma discharge can be an arc plasma discharge. In certain embodiments, the second electrode can be embedded in the GAC at the distal side of the adsorption column. In some embodiments, the proximal side can be a top side and the distal side can be a bottom side of the adsorption column. In certain embodiments, the water treatment system can further include a temperature sensor that measures temperature of the GAC. In some embodiments, contaminants can include perfluorooctane sulfonate, perfluorooctanoic acid, or any combination thereof. In certain embodiments, the displacement gas can be a hydrocarbon gas heavier than air, such as propane, butane, or a mixture thereof. In some embodiments, the gap can be in a range of between 0.5 cm and 1 cm. In certain embodiments, the water treatment system further includes an untreated water inlet into the adsorption column and a treated water outlet out of the adsorption column. In these embodiments, the water treatment system can further include a pump in fluid communication with the untreated water inlet. In some embodiments, the pump can further include a variable frequency motor.

In accordance with one or more embodiments, a method of regenerating granular activated carbon (GAC) in a water treatment system includes draining water out of an adsorption column containing GAC of a water treatment system, injecting a displacement gas into the adsorption column, generating an electrical voltage between a first electrode disposed at a proximal side of the adsorption column and a second electrode disposed at a distal side of the adsorption column to form a plasma discharge within the GAC, thereby regenerating the GAC within the adsorption column, and venting waste gas produced by the plasma discharge. In certain embodiments, the first electrode can be a high voltage electrode, the second electrode can be a ground electrode, and a high voltage power supply can be electrically connected to the first electrode. In certain other embodiments, the first electrode can be a ground electrode, the second electrode can be a high voltage electrode, and a high voltage power supply can be electrically connected to the second electrode. In some embodiments, the method can further include adjusting output power of the high voltage power supply based on a thermostatic feedback signal from a temperature sensor that measures temperature of the GAC. In certain embodiments, the electrical voltage can be generated for a regeneration time that is less than 30 min, such as less than 10 min, or less than 1 min.

In accordance with one or more embodiments, a method of treating water includes flowing untreated water into an adsorption column including granular activated carbon (GAC) that adsorbs contaminants from the water onto the GAC, thereby producing treated water, flowing the treated water out of the adsorption column, draining water out of the adsorption column, injecting a displacement gas into the adsorption column, generating an electrical voltage between a first electrode disposed at a proximal side of the adsorption column and a second electrode disposed at a distal side of the adsorption column to form a plasma discharge within the GAC, thereby regenerating the GAC within the adsorption column, and venting waste gas produced by the plasma discharge. In certain embodiments, the first electrode can be a high voltage electrode, the second electrode can be a ground electrode, and a high voltage power supply can be electrically connected to the first electrode. In certain other embodiments, the first electrode can be a ground electrode, the second electrode can be a high voltage electrode, and a high voltage power supply can be electrically connected to the second electrode. In some embodiments, the method can further include adjusting output power of the high voltage power supply based on a thermostatic feedback signal from a temperature sensor that measures temperature of the GAC. In certain embodiments, the electrical voltage can be generated for a regeneration time that is less than 30 min, such as less than 10 min, or less than 1 min.

The approach described herein leverages the exceptionally large surfaces of GAC to remove PFAS from water and then decomposes/destroys PFAS collected on the GAC surface with in-situ arc plasma (ISAP). In other words, the approach described herein enables GAC to remove PFAS continuously or virtually continuously—almost indefinitely with the help of arc plasma.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements. The figures are not necessarily drawn to scale, emphasis instead being placed upon illustrating embodiments.

DETAILED DESCRIPTION

It is to be understood that the figures and descriptions of the present invention have been simplified to illustrate elements that are relevant for a clearer comprehension of the present invention, while eliminating, for the purpose of clarity, many other elements found in systems and methods of plasma discharge in liquid. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

"HV" as used herein means high-voltage, such as a voltage in excess of 1,000 V.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

The objective of the systems and methods described herein is to remove contaminants such as PFAS in wastewater and leachates and decompose them directly on the spent GAC using high-voltage arc plasma. Insofar as high-voltage plasma can be ignited and well-controlled between carbon granules, then the spent GAC can be regenerated in situ with dramatic increases in energy efficiency. Accordingly, such GAC can be used to remove chemical contaminants in wastewater and leachate without leaving any treatment gap or secondary waste problems.

Figure 1A:
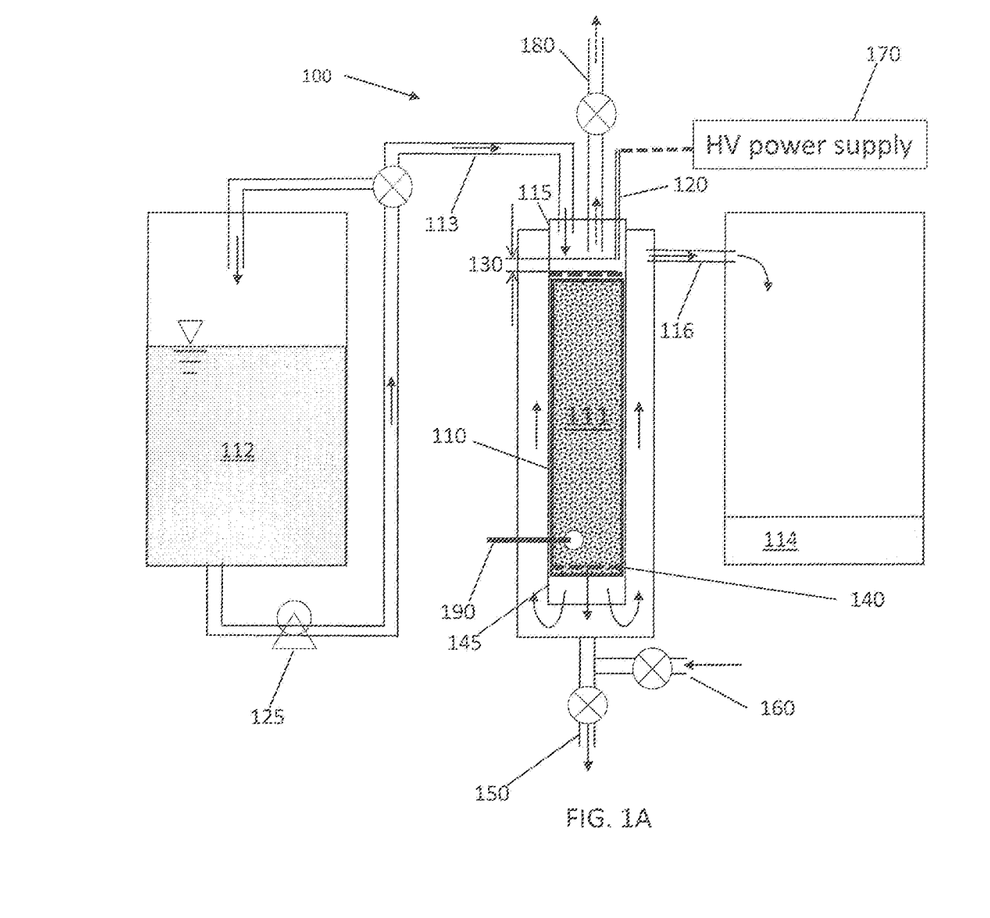
FIG. 1A is a simplified cross-section view of a water treatment system in accordance with one or more embodiments.

The approach described herein uses in-situ arc plasma (ISAP) for the regeneration of wet spent GAC. ISAP utilizes two metal electrodes—one high-voltage (HV) and the other ground, which, in one embodiment, are positioned at the top and bottom, respectively, of each wet spent GAC column or vessel. In accordance with one or more embodiments, a water treatment system 100 shown in FIG. 1A includes an adsorption column 110 including granular activated carbon (GAC) 111 that adsorbs contaminants onto the GAC 111 from untreated water 112 that flows into the adsorption column 110 through the untreated water inlet 113, thereby producing treated water 114 that flows out of the adsorption column 110 through the treated water outlet 116, a first electrode 120 disposed at a proximal side 115 of the adsorption column 110, with a gap 130 between the first electrode 120 and the GAC 111, a second electrode 140 disposed at a distal side 145 of the adsorption column 110, a drain outlet 150 in fluid communication with the adsorption column 110 for draining water out of the adsorption column 110, a gas inlet 160 in fluid communication with the adsorption column 110 for injecting a displacement gas into the adsorption column 110, a high voltage power supply 170 electrically connected to one of the first electrode 120 and the second electrode 140 for generating a plasma discharge within the GAC 111, thereby regenerating the GAC 111 within the adsorption column 110, and a gas outlet 180 in fluid communication with the adsorption column 110 for venting waste gas produced by the plasma discharge. In one embodiment, as shown in FIG. 1A, the first electrode 120 is a high voltage electrode, the second electrode 140 is a ground electrode, and the high voltage power supply 170 is electrically connected to the first electrode 120. Alternatively, the first electrode 120 can be a ground electrode, the second electrode 140 can be a high voltage electrode, and the high voltage power supply 170 can be electrically connected to the second electrode 140. The plasma discharge can be an arc plasma discharge, a micro-arc plasma discharge, a corona plasma discharge, or the like. As shown in FIG. 1A, the proximal side 115 is a top side and the distal side 145 is a bottom side of the adsorption column 110. The system 100 optionally also includes a temperature sensor 190 that measures temperature of the GAC 111.

Since it is essential to minimize or completely eliminate oxygen from the adsorption column 110 during the regeneration process for spent GAC, one embodiment employs as a displacement gas a hydrocarbon heavier than air inside the GAC reactor 110, such as propane ($C_3H_8$) or butane ($C_4H_{10}$), or a mixture thereof, introduced through the gas inlet 160. Furthermore, as shown in FIG. 1B, since the ISAP-regeneration time is expected to be relatively short (i.e., less than 30 min), one HV power supply 170 can be used to regenerate multiple GAC systems 110A, 110B, and 110C in situ, significantly improving the regeneration efficiency of the spent GAC system.

In general, the regeneration time for spent GAC depends on the power of the plasma discharge (i.e., current and voltage). Regeneration efficiency can be determined from adsorption equilibrium isotherms. See Qu et al., *DBD regeneration of GAC loaded with acid orange* 7. Asia-Pac J. Chem. Eng. 2009. 4: p. 649-653. One embodiment enables the regeneration of one spent GAC column to be completed in less than 30 min, such as less than 10 min, or less than 1 min. This regeneration time is appropriate relative to the 10 min empty bed contact times commonly reported by industry for PFAS adsorption by GAC in water and wastewater. It is important that the regeneration time should be relatively short, such that a single HV power supply can regenerate multiple spent GAC columns, thus significantly improving the energy efficiency of the ISAP regeneration method and enabling this regeneration method to be developed in small (e.g, 1-5 gallon per minute (gpm)), medium (e.g., 5-50 gpm), and large (e.g, 50-500 gpm) water treatment systems. FIG. 1C shows a schematic diagram of an ISAP regeneration system where three GAC columns 110A, 110B, and 110C are connected in series, and the HV 120A, 120B, and 120C and ground 140A, 140B, and 140C electrodes for generation of arc plasma are positioned at the top and bottom of each GAC column, respectively. One embodiment uses multiple cylindrical GAC columns (i.e., 3-9 ft in height) to remove chemical contaminants from wastewater/leachates and regenerate GAC within the columns using arc plasma. Note, if one applies plasma directly to water, arc plasma alone cannot break the carbon-fluorine bonds in PFAS since the distance between plasma and PFAS molecules is too large if mediated by water.

Figure 1B:
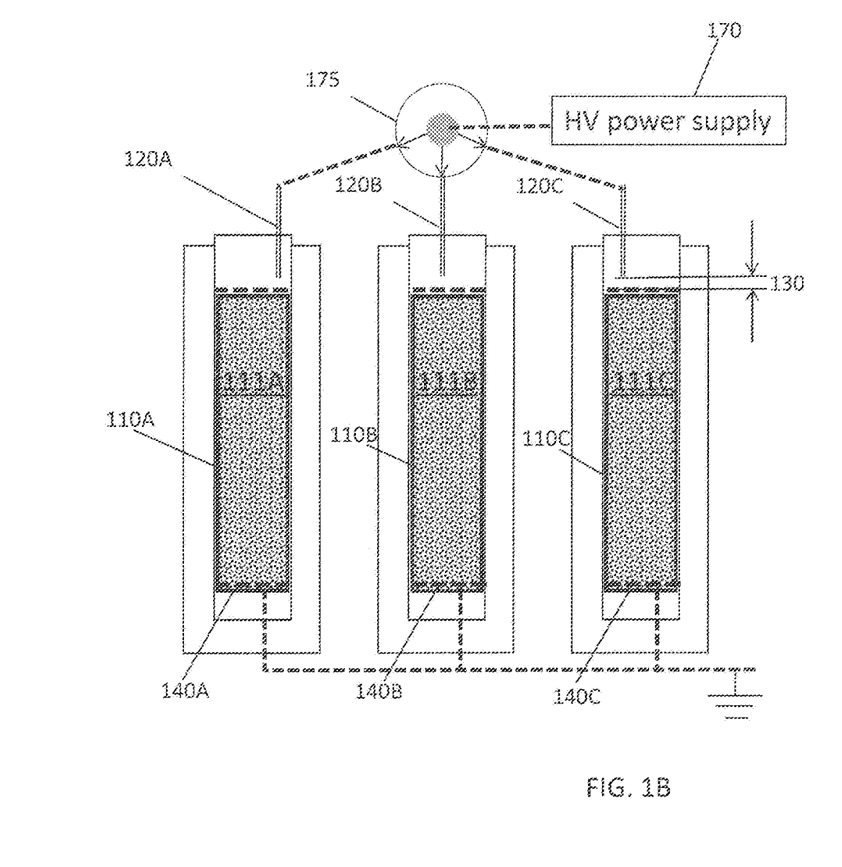
FIG. 1B is a simplified electrical wiring diagram for a water treatment system in accordance with one or more embodiments.
Figure 1C:
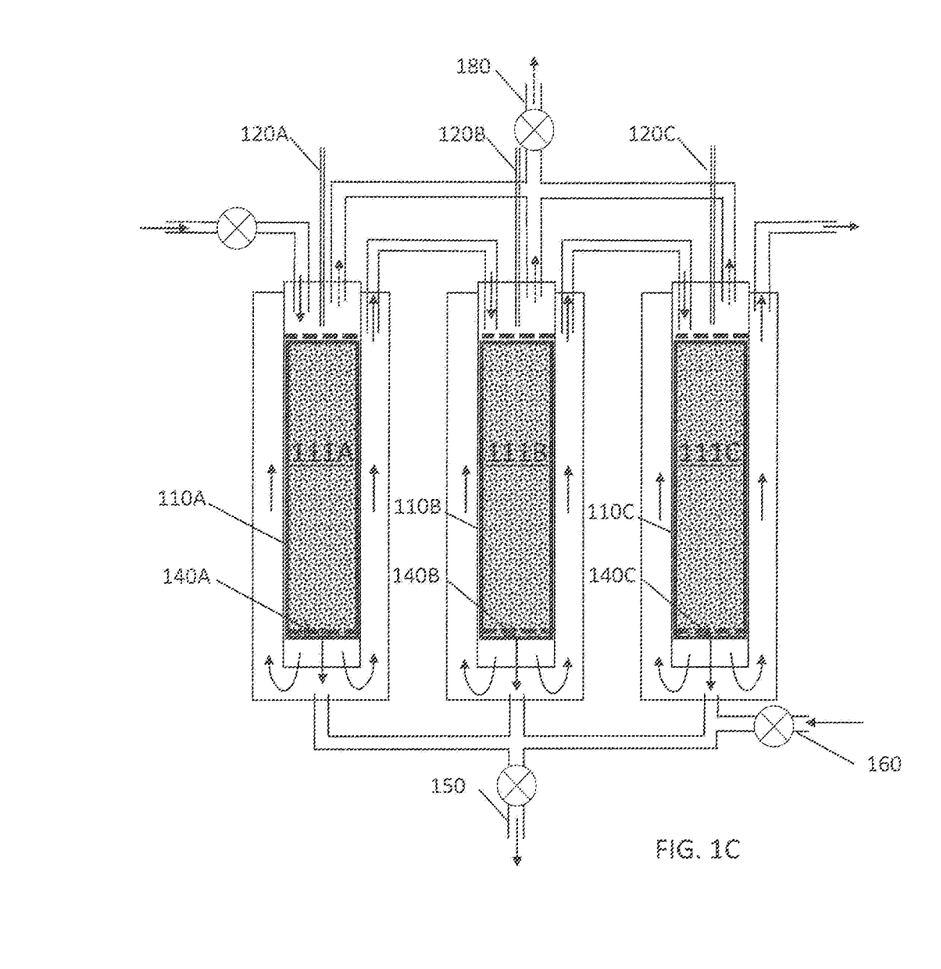
FIG. 1C is a simplified cross-section view of a water treatment system including three adsorption columns in accordance with one or more embodiments.

FIGS. 1B and 1C show a simplified electrical wiring diagram and a simplified cross-section view, respectively, of ISAP-based regeneration for spent GAC. Although FIGS. 1B and 1C show only three GAC columns 110A, 110B, and 110C, additional columns can be added as needed. In the field, GAC vessels having 12-foot diameter are commonly used. FIG. 1B shows the HV electrodes 120A, 120B, and 120C at the top of the GAC and the ground electrodes 140A, 140B, and 140C at the bottom in each column. One HV power supply 170 can be used for the regeneration of multiple spent GAC columns via a HV relay switch 175 shown in FIG. 1B. Larger, higher current HV power supplies can be employed for simultaneous treatment of multiple columns. Note that the HV electrode 120 does not touch the GAC and is positioned at a gap or suspended distance 130 in a range of between 0.5 cm and 1 cm from the top of GAC column (i.e., when water is drained prior to the application of plasma). The appropriate size for the gap 130 can be determined from the Paschen curve.

In one embodiment, a HV rod-shaped metal electrode 120 is used whose diameter is 0.5 inches. A range of different HV electrode materials whose melting temperatures are shown in Table 1 can be used, such as titanium, stainless steel, and tungsten.

TABLE 1

Melting temperatures of stainless steel, titanium, and tungsten.

| Metal | Melting Temperature (° C.) |
|---|---|
| Stainless Steel | 1,510 |
| Titanium | 1,670 |
| Tungsten | 3,400 |

Note that the volume of GAC 111 may be reduced due to GAC losses over time during the regeneration process, changing the relative geometric position of the top surface of the GAC. Thus, it may become necessary to adjust the position of the HV electrode 120 to maintain the constant gap distance 130 over time. The ground electrode 140 is embedded in the GAC column 110 at the bottom in this embodiment. Alternatively, the GAC can be disposed on top of the ground electrode 140. Since the regeneration time for one spent GAC column is relatively short, a number of spent GAC columns can be regenerated, one at a time, with one HV power supply 170 via the HV relay switch 175, reducing capital cost as well as operating cost of GAC regeneration. Alternatively, a large power supply 170 can be used to treat multiple GAC vessels simultaneously.

Turning back to FIG. 1A, in accordance with one or more embodiments, the water treatment system 100 includes a pump 125, optionally including a variable-frequency motor (not shown), so that the flow rate can be varied over a range (i.e., 5 to 25 gpm). The height of the GAC column 110 can be varied in the lab from 3 to 9 ft, whereas the diameter of the GAC column 110 can be constant at 2 inches. These dimensions are appropriate for laboratory simulation of standard 12-foot diameter vessels each flowing 500 gpm, typically employed in industrial processes. Prior to the application of plasma to spent GAC, water is drained from the GAC column through a drain outlet 150 located at the bottom of the GAC columns, and the reactor is filled with a displacement gas heavier than air, such as propane or butane, through the gas inlet 160.

Figure 2A:
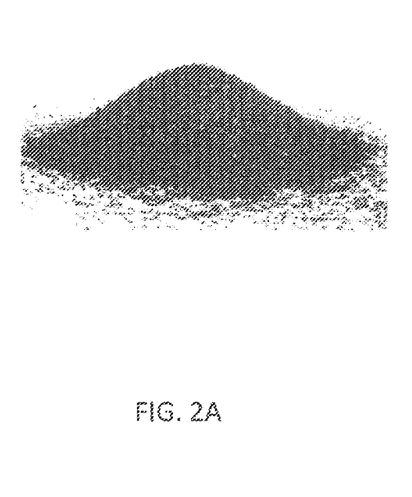
FIG. 2A is a photograph of granular activated carbon particles having 20×40 mesh particle size.
Figure 2B:
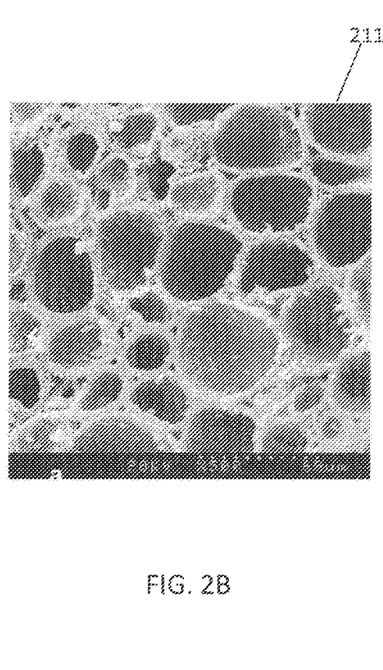
FIG. 2B is a scanning electron microscope image of granular activated carbon particles.
Figure 2C:
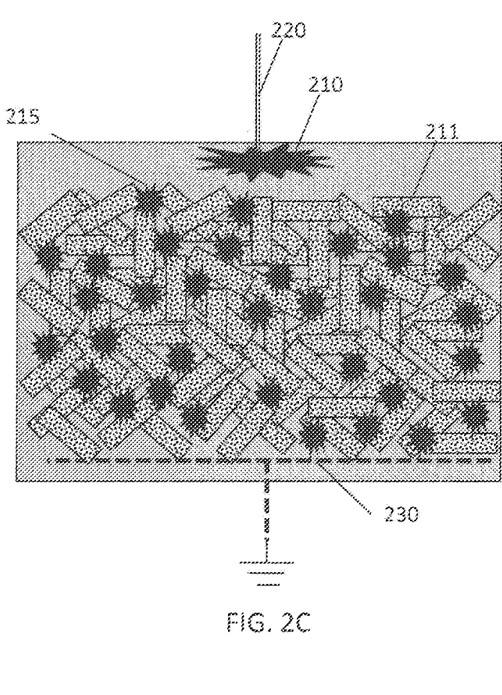
FIG. 2C is a schematic illustration of arc plasma developing in the space between GAC particles in accordance with one or more embodiments.

The ISAP approach generates arc plasma 210 between GAC particles shown in FIG. 2C, using HV electrode 220, ground electrode 230, and the high electric conductivity of GAC itself, i.e., creating arc plasma 215 literally on the surface of GAC particles 211 shown in FIG. 2B, and schematically illustrated in FIG. 2C, enabling the chemical contaminants adsorbed on the surface of the GAC to be exposed to very high temperatures (i.e., greater than 2,000° C.)—which are localized to focal areas 215 at the surfaces of the granules 211, as illustrated in FIG. 2C, with limited bulk heating of vessels. This technique is applicable to any other conductive granular media, besides the granular activated carbon particles having 20×40 mesh particle size shown in FIG. 2A, and also exposes GAC to a number of active plasma species (e.g., $^1O_2$, $OH^-$, $H^-$, $O^-$, $HO_2^-$, $O_2-$, $O_3$, $H_2O_2$, $N^-$, $NO_x$, $NO^-$) which are created by ISAP.

Turning back to FIG. 1A, in ISAP regeneration of spent GAC described herein, waste off-gas is released from the GAC reactor through gas outlet 180 and a valve positioned at the top of the test apparatus, to an activated carbon scrubber (not shown), such that the pressure inside the reactor is always one atmosphere, i.e., zero gauge pressure, for safe operation. In other words, it should be impossible for pressure to build up or for the reactor to rupture, because of the presence of a safety vent 180. In cases where the waste off-gas contains hazardous materials, the waste off-gas can be collected in a separate tank and treated with a separate plasma system such as a gliding arc discharge (a well-established air plasma system).

Although the thermal regeneration process of spent GAC has been used for the purpose of PFAS removal at high temperatures of 800-1,000° C. without major problems, there are several safety issues when PFAS is exposed to high temperature.

Any GAC regeneration process should not produce elemental fluorine F because it is highly toxic to living organisms. Its effects in humans start at concentrations lower than those of hydrogen cyanide (50 parts per million (ppm)) and are similar to those of chlorine: significant irritation of the eyes and the respiratory system as well as liver and kidney damage occur above 25 ppm, which is immediately dangerous to life and human health. The eyes and nose are seriously damaged at 100 ppm, and inhalation of 1,000 ppm fluorine will cause death in minutes.

Hydrogen gas ($H_2$) should not be present in GAC regeneration involving PFAS as hydrogen reacts explosively with fluorine. Since graphite combines with fluorine F above 400° C. to produce carbon monofluoride, and higher temperatures generate potentially explosive gaseous fluorocarbons, any GAC regeneration process, including those employed in innovative research studies, must not produce fluorine F to avoid gaseous fluorocarbons.

Conventional thermal regeneration is simply unsuitable when GAC is used for PFAS removal. The reason for this is, although oxygen is deliberately depleted in the reaction zone in thermal regeneration, $CO_2$ and $H_2O$ accumulate as combustion products in furnaces. For this reason and others, specialized reactivation kilns are used to incinerate PFAS-laden GAC by industry. When carbon in GAC reacts with water ($H_2O$) at elevated temperatures, carbon monoxide (CO) and $H_2$ can be produced as shown below:

$$C(s) + CO_2 \rightarrow 2CO \qquad (1)$$

$$C(s) + H_2O \rightarrow CO + H_2 \qquad (2)$$

Carbon monoxide reacts with fluorine at or just above room temperature. In addition, GAC is being destroyed if this reaction occurs, while generating an explosive gas, $H_2$. Thus, the production of CO and $H_2$ must be avoided during the GAC regeneration process by eliminating $CO_2$ and water from the GAC reactor.

Oxygen does not combine with fluorine under ambient conditions, but can react with fluorine when electric discharges are used at low temperatures and pressures, resulting in oxyfluoride, which is potentially explosive. However, the products tend to disintegrate into their constituent elements when heated.

Therefore, one embodiment described herein displaces air with higher hydrocarbons such as propane ($C_3H_8$) or butane ($C_4H_{10}$), which are almost two times heavier than air. Prior to applying plasma discharge to spent GAC, liquid water is completely drained, and no oxygen is left in the GAC column. The plasma discharge then evaporates liquid water from the GAC to water vapor, so that that GAC dries during the regeneration process. The most ideal chemical reaction in the GAC regeneration process may be the one that converts PFOS to hydrogen fluoride HF (gas) with the help of hydrocarbon as shown in the following equation:

$$C(s)(GAC) + {}^{17}\!/\!_8 C_3H_8(Propane) + C_8F_{17}HO_3S(PFOS)$$
$$\rightarrow HF(gas) + C(s) + SO_2 + H_2O \qquad (3)$$

Hydrogen fluoride HF (gas), upon contact with moisture or water, immediately converts to hydrofluoric acid, which is a weak acid at low concentrations but corrosive and toxic. Nevertheless, HF is relatively safe and easier to manage compared with fluorine F. Furthermore, this chemical reaction does not involve hydrogen gas or oxygen, significantly reducing the risk of explosion. HF is a scavenger of oxygen, creating a positive safety mechanism, further reducing the risk of explosion.

Figure 3A:
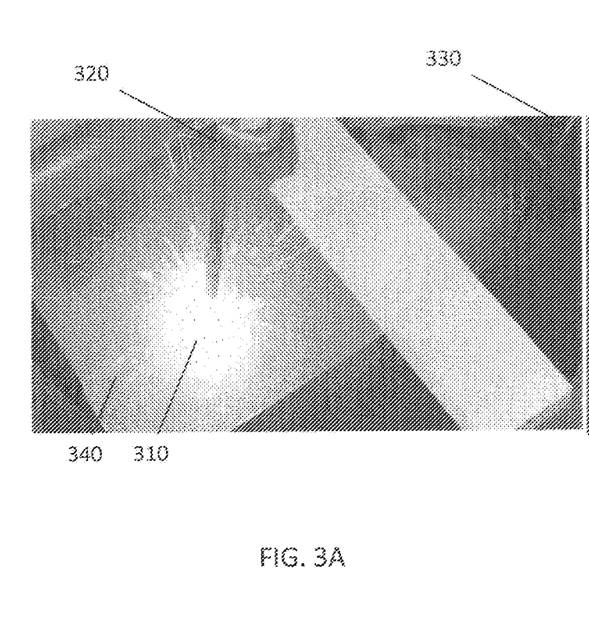
FIG. 3A is a photograph of arc plasma at the beginning of a preliminary test with wet sand in accordance with one or more embodiments.
Figure 3B:
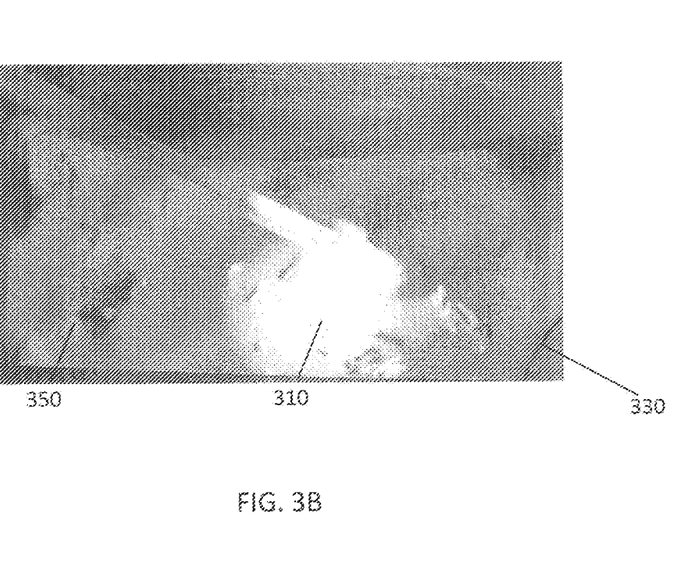
FIG. 3B is a photograph of arc plasma and sand slag melted by the arc plasma in accordance with one or more embodiments.

In order to demonstrate the feasibility of thermal reforming, a preliminary test was performed with wet sand whose melting temperature is about 1,600° C. using a HV power supply of 3 kW. The photograph shown in FIG. 3A depicts arc plasma 310 generated between HV electrode 320 and ground electrode 330 in wet sand 340 at the beginning of the test, whereas the photograph shown in FIG. 3B depicts sand slag 350 after the wet sand was melted by arc plasma 310. Sand slag 350 formed beneath the HV electrode 320 within one minute, and the size of fused slag volume grew with time over the following 10 min. This melting clearly indicates that the temperature of the arc plasma 310 was well above 1,600° C. While wet sand changed to slag, the container did not burn or melt because it still had liquid water in it, creating significant observable discharge steam while maintaining a temperature of 100° C. or lower-since the top of the plastic container was open to the atmosphere and could not exceed the boiling temperature of water. Because the melting temperature of GAC is relatively high (i.e., 3,550° C.), thermal reforming of spent GAC using ISAP, without melting or burning GAC, is practical in water vapor and an oxygen-limited environment. In order to ensure that the temperature of spent GAC does not approach its melting temperature of 3,550° C., GAC temperature can be monitored using a temperature sensor 190, shown in FIG. 1A, and the temperature of the GAC 111 can be limited to below a threshold number (e.g., 2,000° C.) by adjusting the output power of the HV power supply 170 using a thermostatic feedback signal from the temperature sensor 190.

Figure 4:
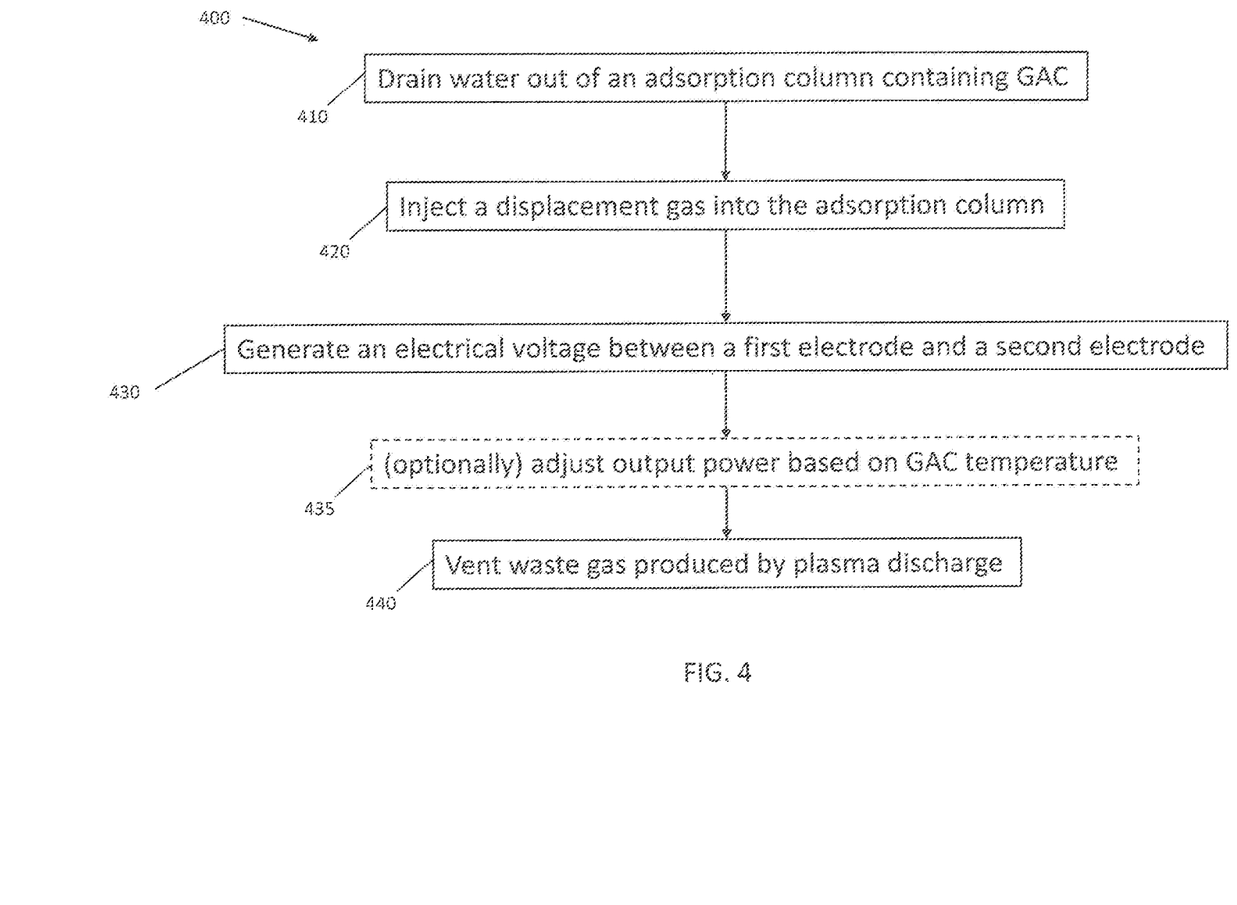
FIG. 4 is a flow chart of a method of regenerating GAC in a water treatment system in accordance with one or more embodiments.

In accordance with one or more embodiments, a method 400 shown in FIG. 4 of regenerating granular activated carbon (GAC) in a water treatment system includes draining 410 water out of an adsorption column containing GAC of a water treatment system, injecting 420 a displacement gas into the adsorption column, generating 430 an electrical voltage between a first electrode disposed at a proximal side of the adsorption column and a second electrode disposed at a distal side of the adsorption column to form a plasma discharge within the GAC, thereby regenerating the GAC within the adsorption column, and venting 440 waste gas produced by the plasma discharge. In certain embodiments, the first electrode can be a high voltage electrode, the second electrode can be a ground electrode, and a high voltage power supply can be electrically connected to the first electrode. In certain other embodiments, the first electrode can be a ground electrode, the second electrode can be a high voltage electrode, and a high voltage power supply can be electrically connected to the second electrode. In some embodiments, the method can optionally include adjusting 435 output power of the high voltage power supply based on a thermostatic feedback signal from a temperature sensor that measures temperature of the GAC. In certain embodiments, the electrical voltage can be generated for a regeneration time that is less than 30 min, such as less than 10 min, or less than 1 min.

Figure 5:
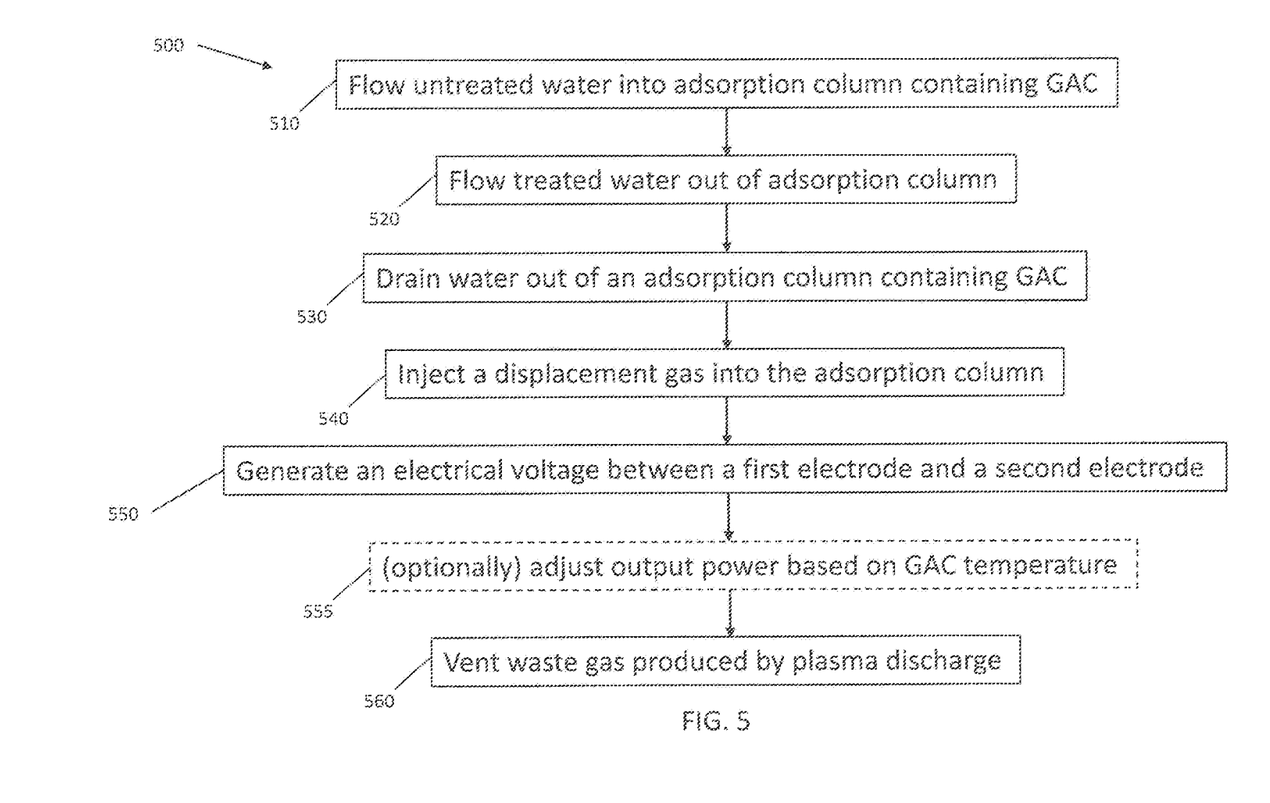
FIG. 5 is a flow chart of a method of treating water in accordance with one or more embodiments.

In accordance with one or more embodiments, a method 500 shown in FIG. 5 of treating water includes flowing 510 untreated water into an adsorption column including granular activated carbon (GAC) that adsorbs contaminants from the water onto the GAC, thereby producing treated water, flowing 520 the treated water out of the adsorption column, draining 530 water out of the adsorption column, injecting 540 a displacement gas into the adsorption column, generating 550 an electrical voltage between a first electrode disposed at a proximal side of the adsorption column and a second electrode disposed at a distal side of the adsorption column to form a plasma discharge within the GAC, thereby regenerating the GAC within the adsorption column, and venting 560 waste gas produced by the plasma discharge. In certain embodiments, the first electrode can be a high voltage electrode, the second electrode can be a ground electrode, and a high voltage power supply can be electrically connected to the first electrode. In certain other embodiments, the first electrode can be a ground electrode, the second electrode can be a high voltage electrode, and a high voltage power supply can be electrically connected to the second electrode. In some embodiments, the method can optionally include adjusting 555 output power of the high voltage power supply based on a thermostatic feedback signal from a temperature sensor that measures temperature of the GAC. In certain embodiments, the electrical voltage can be generated for a regeneration time that is less than 30 min, such as less than 10 min, or less than 1 min.

Beyond the primary thermal reforming mechanism, the aforementioned plasma reforming of spent GAC is also beneficial as arcs develop between GAC particles. Plasma discharges produce not only UV but also various active plasma species such as $^1O_2$, OH., H., O., $HO_2$., $O_2^-$, $O_3$, $H_2O_2$, N., $NO_x$, NO., and charged particles, most of which are powerful oxidizing agents, and thus potentially useful in enhancing the destruction of chemical contaminants. See Yang, Y., Y. I. Cho, and A. Fridman, *Plasma Discharge in Liquid: Water Treatment and Applications*. 2012, New York: CRC Press. Although the half-lives of most active plasma species are relatively short, the arc plasma develops directly on the surface of the GAC, and thus one can say that plasma is generated on the surface of granules at the very locus of chemical contaminants. As such, plasma reforming of the spent GAC is a practical mechanism that can increase PFAS destruction efficiency.

The concept of regenerating spent GAC in situ and without the use of a reactivation kiln is a major breakthrough, allowing the GAC system to be used in small and medium water treatment systems, as well as in large water treatment facilities. In summary, the ISAP-based GAC regeneration method enables GAC to remove and ISAP to destroy PFAS in water in-situ while minimizing capital and operating costs, thus providing an economically viable solution in removing PFAS from wastewater and leachate. Considering the widespread incidence of PFAS contamination and its high recalcitrance to most treatment approaches, the approach described herein employs a versatile technique that is both energy-efficient and robust in destructive potency, without migrating away from GAC as the primary treatment over to more costly and complex methods like ion exchange or membrane filtration. In this regard, the approach described herein provides an improved method to simultaneously remove and destroy PFAS in contaminated surface water, groundwater and wastewater.

A key aspect is the regeneration of spent GAC with in situ arc plasma rather than just altering the adsorption performance/efficiency of GAC for various PFAS. The ISAP not only provides thermal reforming but also plasma reforming when arcs develop between GAC particles. The thermal reforming of spent GAC is feasible without ruining the GAC, as the melting temperature of typical activated carbon is around 3,550° C. whereas the arc surface temperature is about 2,000° C. See Fridman, A., *Plasma Chemistry*. 2008: Cambridge University Press, Cambridge, UK. Considering that conventional thermal regeneration of spent GAC is often conducted at a temperature in a range of 800-1,000° C. in reactivation kilns, ISAP provides a significantly higher temperature, localized directly on carbon granules with less bulk- and vessel heating losses, providing extremely high energy efficiency. See Kucharzyk, K. H., et al., *Novel treatment technologies for PFAS compounds: A critical review*. Journal of environmental management, 2017. 204: p. 757-764; Guo, Y. and E. Du, *The Effects of Thermal Regeneration Conditions and Inorganic Compounds on the Characteristics of Activated Carbon Used in Power Plant* Energy Procedia, 2012. 17: p. 444-449. In this regard, ISAP is ideal for PFAS destruction on GAC.

Further Example Embodiments

Example 1 is a water treatment system that includes an adsorption column including granular activated carbon (GAC) that adsorbs contaminants from untreated water onto the GAC, thereby producing treated water, a first electrode disposed at a proximal side of the adsorption column, with a gap between the first electrode and the GAC, a second electrode disposed at a distal side of the adsorption column, a drain outlet in fluid communication with the adsorption column for draining water out of the adsorption column, a gas inlet in fluid communication with the adsorption column for injecting a displacement gas into the adsorption column, a high voltage power supply electrically connected to one of the first electrode and the second electrode for generating a plasma discharge within the GAC, thereby regenerating the GAC within the adsorption column, and a gas outlet in fluid communication with the adsorption column for venting waste gas produced by the plasma discharge.

Example 2 includes the subject matter of Example 1, wherein the first electrode is a high voltage electrode, the second electrode is a ground electrode, and the high voltage power supply is electrically connected to the first electrode.

Example 3 includes the subject matter of Example 1, wherein the first electrode is a ground electrode, the second electrode is a high voltage electrode, and the high voltage power supply is electrically connected to the second electrode.

Example 4 includes the subject matter of any of Examples 1-3, wherein the plasma discharge is an arc plasma discharge.

Example 5 includes the subject matter of any of Examples 1-4, wherein the second electrode is embedded in the GAC at the distal side of the adsorption column.

Example 6 includes the subject matter of any of Examples 1-5, wherein the proximal side is a top side and the distal side is a bottom side of the adsorption column.

Example 7 includes the subject matter of any of Examples 1-6, further including a temperature sensor that measures temperature of the GAC.

Example 8 includes the subject matter of any of Examples 1-7, wherein contaminants include perfluorooctane sulfonate, perfluorooctanoic acid, or any combination thereof.

Example 9 includes the subject matter of any of Examples 1-8, wherein the displacement gas is a hydrocarbon gas heavier than air.

Example 10 includes the subject matter of any of Examples 1-9, wherein the displacement gas is propane, butane, or a mixture thereof.

Example 11 includes the subject matter of any of Examples 1-10, wherein the gap is in a range of between 0.5 cm and 1 cm.

Example 12 includes the subject matter of any of Examples 1-11, further including an untreated water inlet into the adsorption column and a treated water outlet out of the adsorption column.

Example 13 includes the subject matter of Example 12, further including a pump in fluid communication with the untreated water inlet.

Example 14 includes the subject matter of Example 13, wherein the pump includes a variable frequency motor.

Example 15 is a method of regenerating granular activated carbon (GAC) in a water treatment system that includes draining water out of an adsorption column containing GAC of a water treatment system, injecting a displacement gas into the adsorption column, generating an electrical voltage between a first electrode disposed at a proximal side of the adsorption column and a second electrode disposed at a distal side of the adsorption column to form a plasma discharge within the GAC, thereby regenerating the GAC within the adsorption column, and venting waste gas produced by the plasma discharge.

Example 16 includes the subject matter of Example 15, wherein the first electrode is a high voltage electrode, the second electrode is a ground electrode, and a high voltage power supply is electrically connected to the first electrode.

Example 17 includes the subject matter of Example 15, wherein the first electrode is a ground electrode, the second electrode is a high voltage electrode, and a high voltage power supply is electrically connected to the second electrode.

Example 18 includes the subject matter of any of Examples 15-17, further including adjusting output power of the high voltage power supply based on a thermostatic feedback signal from a temperature sensor that measures temperature of the GAC.

Example 19 includes the subject matter of any of Examples 15-18, wherein the electrical voltage is generated for a regeneration time that is less than 30 min, such as less than 10 min, or less than 1 min.

Example 20 is a method of treating water that includes flowing untreated water into an adsorption column including granular activated carbon (GAC) that adsorbs contaminants from the water onto the GAC, thereby producing treated water, flowing the treated water out of the adsorption column, draining water out of the adsorption column, injecting a displacement gas into the adsorption column, generating an electrical voltage between a first electrode disposed at a proximal side of the adsorption column and a second electrode disposed at a distal side of the adsorption column to form a plasma discharge within the GAC, thereby regenerating the GAC within the adsorption column, and venting waste gas produced by the plasma discharge.

Example 21 includes the subject matter of Example 20, wherein the first electrode is a high voltage electrode, the second electrode is a ground electrode, and a high voltage power supply is electrically connected to the first electrode.

Example 22 includes the subject matter of Example 20, wherein the first electrode is a ground electrode, the second electrode is a high voltage electrode, and a high voltage power supply is electrically connected to the second electrode.

Example 23 includes the subject matter of any of Examples 20-22, further including adjusting output power of the high voltage power supply based on a thermostatic feedback signal from a temperature sensor that measures temperature of the GAC.

Example 24 includes the subject matter of any of Examples 20-23, wherein the electrical voltage is generated for a regeneration time that is less than 30 min, such as less than 10 min, or less than 1 min.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A water treatment system comprising:
an adsorption column including granular activated carbon (GAC) that adsorbs contaminants from untreated water onto the GAC, thereby producing treated water;
a first electrode disposed at a proximal side of the adsorption column, with a gap between the first electrode and the GAC;
a second electrode disposed at a distal side of the adsorption column;
a drain outlet in fluid communication with the adsorption column for draining water out of the adsorption column;
a gas inlet in fluid communication with the adsorption column for injecting a displacement gas into the adsorption column;
a high voltage power supply electrically connected to one of the first electrode and the second electrode for generating a plasma discharge within the GAC, thereby regenerating the GAC within the adsorption column; and
a gas outlet in fluid communication with the adsorption column for venting waste gas produced by the plasma discharge.

2. The water treatment system of claim 1, wherein the first electrode is a high voltage electrode, the second electrode is a ground electrode, and the high voltage power supply is electrically connected to the first electrode.

3. The water treatment system of claim 1, wherein the first electrode is a ground electrode, the second electrode is a high voltage electrode, and the high voltage power supply is electrically connected to the second electrode.

4. The water treatment system of claim 1, wherein the plasma discharge is an arc plasma discharge.

5. The water treatment system of claim 1, wherein the second electrode is embedded in the GAC at the distal side of the adsorption column.

6. The water treatment system of claim 1, wherein the proximal side is a top side and the distal side is a bottom side of the adsorption column.

7. The water treatment system of claim 1, further including a temperature sensor that measures temperature of the GAC.

8. The water treatment system of claim 1, wherein contaminants include perfluorooctane sulfonate, perfluorooctanoic acid, or any combination thereof.

9. The water treatment system of claim 1, wherein the displacement gas is a hydrocarbon gas heavier than air.

10. The water treatment system of claim 9, wherein the displacement gas is propane, butane, or a mixture thereof.

11. The water treatment system of claim 1, wherein the gap is in a range of between 0.5 cm and 1 cm.

12. The water treatment system of claim 1, further including an untreated water inlet into the adsorption column and a treated water outlet out of the adsorption column.

13. The water treatment system of claim 12, further including a pump in fluid communication with the untreated water inlet.

14. The water treatment system of claim 13, wherein the pump includes a variable frequency motor.

15. A method of regenerating granular activated carbon (GAC) in a water treatment system, the method comprising:
    draining water out of an adsorption column containing GAC of a water treatment system;
    injecting a displacement gas into the adsorption column;
    generating an electrical voltage between a first electrode disposed at a proximal side of the adsorption column and a second electrode disposed at a distal side of the adsorption column to form a plasma discharge within the GAC, thereby regenerating the GAC within the adsorption column; and
    venting waste gas produced by the plasma discharge.

16. The method of claim 15, wherein the first electrode is a high voltage electrode, the second electrode is a ground electrode, and a high voltage power supply is electrically connected to the first electrode.

17. The method of claim 16, further including adjusting output power of the high voltage power supply based on a thermostatic feedback signal from a temperature sensor that measures temperature of the GAC.

18. The method of claim 15, wherein the first electrode is a ground electrode, the second electrode is a high voltage electrode, and a high voltage power supply is electrically connected to the second electrode.

19. The method of claim 18, further including adjusting output power of the high voltage power supply based on a thermostatic feedback signal from a temperature sensor that measures temperature of the GAC.

20. The method of claim 15, wherein the electrical voltage is generated for a regeneration time that is less than 30 min.

21. The method of claim 20, wherein the regeneration time is less than 10 min.

22. The method of claim 21, wherein the regeneration time is less than 1 min.

23. A method of treating water, the method comprising:
    flowing untreated water into an adsorption column including granular activated carbon (GAC) that adsorbs contaminants from the water onto the GAC, thereby producing treated water;
    flowing the treated water out of the adsorption column;
    draining water out of the adsorption column;
    injecting a displacement gas into the adsorption column;
    generating an electrical voltage between a first electrode disposed at a proximal side of the adsorption column and a second electrode disposed at a distal side of the adsorption column to form a plasma discharge within the GAC, thereby regenerating the GAC within the adsorption column; and
    venting waste gas produced by the plasma discharge.

24. The method of claim 23, wherein the first electrode is a high voltage electrode, the second electrode is a ground electrode, and a high voltage power supply is electrically connected to the first electrode.

25. The method of claim 24, further including adjusting output power of the high voltage power supply based on a thermostatic feedback signal from a temperature sensor that measures temperature of the GAC.

26. The method of claim 23, wherein the first electrode is a ground electrode, the second electrode is a high voltage electrode, and a high voltage power supply is electrically connected to the second electrode.

27. The method of claim 26, further including adjusting output power of the high voltage power supply based on a thermostatic feedback signal from a temperature sensor that measures temperature of the GAC.

28. The method of claim 23, wherein the electrical voltage is generated for a regeneration time that is less than 30 min.

29. The method of claim 28, wherein the regeneration time is less than 10 min.

30. The method of claim 29, wherein the regeneration time is less than 1 min.

* * * * *